United States Patent
Zhang

(10) Patent No.: US 11,115,081 B2
(45) Date of Patent: Sep. 7, 2021

(54) ROUTING METHOD FOR MULTIPLE SECURITY ELEMENTS, NFC CONTROLLER AND NFC DEVICE

(71) Applicant: ZTE CORPORATION, Guangdong (CN)

(72) Inventor: Qingli Zhang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/765,202

(22) PCT Filed: Sep. 18, 2018

(86) PCT No.: PCT/CN2018/106308
§ 371 (c)(1),
(2) Date: May 19, 2020

(87) PCT Pub. No.: WO2019/100829
PCT Pub. Date: May 31, 2019

(65) Prior Publication Data
US 2020/0280341 A1  Sep. 3, 2020

(30) Foreign Application Priority Data

Nov. 22, 2017  (CN) .......................... 201711170809.9

(51) Int. Cl.
*H04B 5/00* (2006.01)
*G06F 16/245* (2019.01)
(Continued)

(52) U.S. Cl.
CPC ....... *H04B 5/0031* (2013.01); *G06F 16/2282* (2019.01); *G06F 16/245* (2019.01); *H04L 49/25* (2013.01)

(58) Field of Classification Search
CPC . H04B 5/0031; G06F 16/245; G06F 16/2282; H04L 49/25
(Continued)

(56) References Cited

U.S. PATENT DOCUMENTS

| | | | |
|---|---|---|---|
| 9,351,164 B2 | 5/2016 | Van Nieuwenhuyze et al. | |
| 2013/0023309 A1 | 1/2013 | Holtmanns et al. | |

(Continued)

FOREIGN PATENT DOCUMENTS

| | | | |
|---|---|---|---|
| CN | 103065107 A | 4/2013 | |
| CN | 104580159 A | 4/2015 | |

(Continued)

OTHER PUBLICATIONS

WIPO, International Search Report dated Nov. 8, 2018.
(Continued)

*Primary Examiner* — Don N Vo

(57) ABSTRACT

Disclosed are a routing method for multiple security elements (SEs), an NFC controller and an NFC device. The NFC device includes at least three SEs capable of working simultaneously; after receiving a request from an external device for accessing an NFC application, the NFC controller searches a routing table for an SE to be routed according to an AID carried in the request; and in a case where the SE is not found, the request is sent to all other SEs in the NFC device except the part of SEs.

11 Claims, 3 Drawing Sheets

(51) Int. Cl.
*G06F 16/22* (2019.01)
*H04L 12/947* (2013.01)
(58) Field of Classification Search
USPC ........................................... 455/41.1
See application file for complete search history.

(56) References Cited

U.S. PATENT DOCUMENTS

| | | | |
|---|---|---|---|
| 2013/0225073 A1* | 8/2013 | O'Donoghue | H04W 4/80 455/41.1 |
| 2013/0331029 A1 | 12/2013 | Tang et al. | |
| 2014/0035727 A1* | 2/2014 | Nguyen | H04W 4/80 340/10.1 |
| 2016/0026993 A1* | 1/2016 | Kang | G06Q 20/321 705/39 |
| 2016/0099759 A1* | 4/2016 | Poon | H05K 999/99 455/41.1 |
| 2016/0142109 A1 | 5/2016 | Kumar et al. | |
| 2016/0309287 A1 | 10/2016 | Nguyen et al. | |
| 2017/0055109 A1* | 2/2017 | Nieuwenhuyze | H04W 40/02 |

FOREIGN PATENT DOCUMENTS

| | | |
|---|---|---|
| CN | 104936129 A | 9/2015 |
| CN | 105405009 A | 3/2016 |
| CN | 107911319 A | 4/2018 |

OTHER PUBLICATIONS

CN201711170809.9 First Office Action (OA1) dated Mar. 2, 2020.
European Patent Office, Supplementary European Search Report for EP Application No. 18880791.1, dated Jun. 21, 2021, pp. 1-3.
European Patent Office, Search Opinion for EP Application No. 18880791.1, dated Jun. 21, 2021, pp. 1-4.

* cited by examiner

ROUTING METHOD FOR MULTIPLE SECURITY ELEMENTS, NFC CONTROLLER AND NFC DEVICE

CROSS-REFERENCE TO RELATED APPLICATION

The present application is based on and claims a priority from the Chinese patent application No. 201711170809.9 filed on Nov. 22, 2017, the entire disclosure of which is incorporated herein by reference.

TECHNICAL FIELD

The present disclosure relates to Near Field Communication (NFC) technologies, and more particularly relates to a routing method for multiple security elements (SEs), an NFC controller and an NFC device.

BACKGROUND

Card emulation is one of the important functions of NFC devices such as NFC mobile phones, upon which various payment functions are relied. For security purpose, a payment system of an NFC mobile phone requires SEs as components thereof. The SEs provide secure storage for sensitive information as well as a secure execution environment for transactions. NFC applications (APPs) reside on the SEs, and each NFC Application has an Application ID (AID).

In the past, an NFC-supported mobile phone generally supports only one security element, but later, Android began to support Host-based Card Emulation (HCE). Some mobile phones began to have embedded SEs (eSEs), and more and more mobile phones began to support a dual-function Universe Integrate Circuit Card (UICC), where both card slots support a Single Wire Protocol (SWP), and the UICC may serve as SEs of the mobile phone. Such an NFC-supported mobile phone may have at least three SEs.

In the existing art, when at least three SEs in the NFC mobile phone are capable of working simultaneously, routing through a routing table is realized by writing AIDs of all the SEs into the routing table, and, after receiving a request from an external device for accessing an NFC application, searching the routing table according to the AID carried in the request. This method can realize direct routing to all the SEs, but may lead to insufficient space in the routing table.

SUMMARY

In view of above, in an embodiment of the present disclosure, there is provided a routing method for multiple security elements. The routing method is applied to an NFC device having at least three SEs capable of working simultaneously, the and routing method includes:

receiving, by an NFC controller in the NFC device, a request from an external device for accessing an NFC application;

searching, by the NFC controller, a routing table for a security element (SE) to be routed according to an AID carried in the request, AID routes for part of the SEs in the NFC device being stored in the routing table;

sending, by the NFC controller in a case where the SE is not found, the request to all other SEs in the NFC device except the part of SEs.

In view of above, in an embodiment of the present disclosure, there is further provided an NFC controller, including:

an external interface module configured to receive a request carrying an AID from an external device for accessing an NFC application;

a routing table module configured to store AID routes for part of SEs in an NFC device, the NFC device having at least three SEs are capable of working simultaneously; and a routing control module configured to search the routing table for an SE to be routed according to the AID carried in the request, and send, in a case where the SE is not found, the request to all other SEs in the NFC device except the part of SEs.

In view of above, in an embodiment of the present disclosure, there is further provided an NFC device, including at least three SEs capable of working simultaneously, and an NFC controller. The NFC controller includes a memory, a processor, and a computer program stored in the memory and executable by the processor, wherein the processor executes the computer program to implement the steps of:

receiving a request from an external device for accessing an NFC application; and searching a routing table for an SE to be routed according to an AID carried in the request, AID routes for part of the SEs in the NFC device being stored in the routing table;

sending, in a case where the SE is not found, the request to all other SEs in the NFC device except the part of SEs.

In view of this, in an embodiment of the present disclosure, there is further provided a computer readable storage medium having a computer program stored thereon which, when executed by a processor, causes the method as described above to be implemented.

The solutions in the above embodiments can provide support for at least three SEs capable of working simultaneously, and make the NFC routing table occupy less space.

DETAILED DESCRIPTION

For clarity and better understanding of the objects, technical solution and advantages of the disclosure, embodiments of the disclosure will now be described in detail in conjunction with the accompanying drawings. It should be noted that the embodiments of the present application and features therein may be combined with each other in any manner as long as they are not contradictory.

Embodiment I

This embodiment provides a routing method for multiple SEs, which is applied to an NFC device having at least three SEs capable of working simultaneously.

Figure 1:
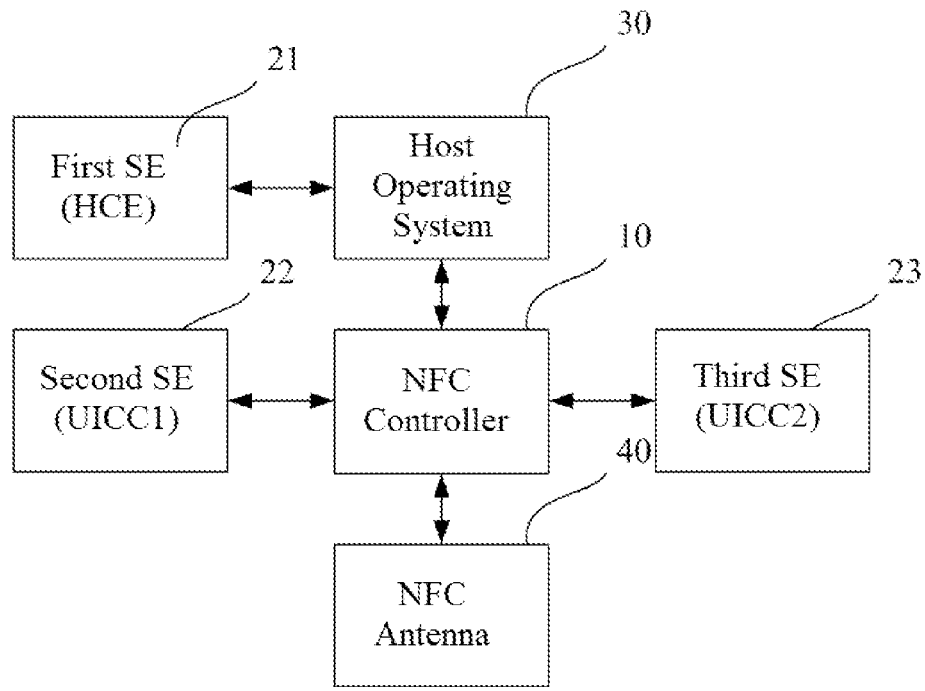
FIG. 1 is a schematic diagram of a portion of an NFC device related to a card emulation function according to Embodiment I of the present disclosure.

The portion of the NFC device related to the card emulation function includes an NFC controller, SEs and an NFC antenna. As shown in FIG. 1, the NFC device of this embodiment includes three SEs, among which a first SE 21 is host-based card emulation, i.e., an HCE, and the NFC controller 10 communicates with the HCE through a host operating system 30, such as an Android system. The second SE 22 and the third SE 23 are UICC1 and UICC2, respectively. The three SEs in the NFC device can work simultaneously. It should be noted that the above types and number of SEs are only exemplary, and the number of SEs may be more than three. For example, an embedded SE, an SE on an SD card, or the like may also be included.

The host operating system 30 is a part that directly interacts with a user, including prompting the user and processing the user's selections, interacting with the NFC controller 10 and making corresponding settings for the NFC controller 10, and so on. The NFC controller 10 communicates with an external device, such as a card reader, via an NFC antenna 40, and, after receiving a request from the external device for accessing an NFC application, interacts with the respective SEs 21-23 according to routing information in the routing table, and returns a response to the external device. The routing table may be integrated in the NFC controller 10.

Figure 2:
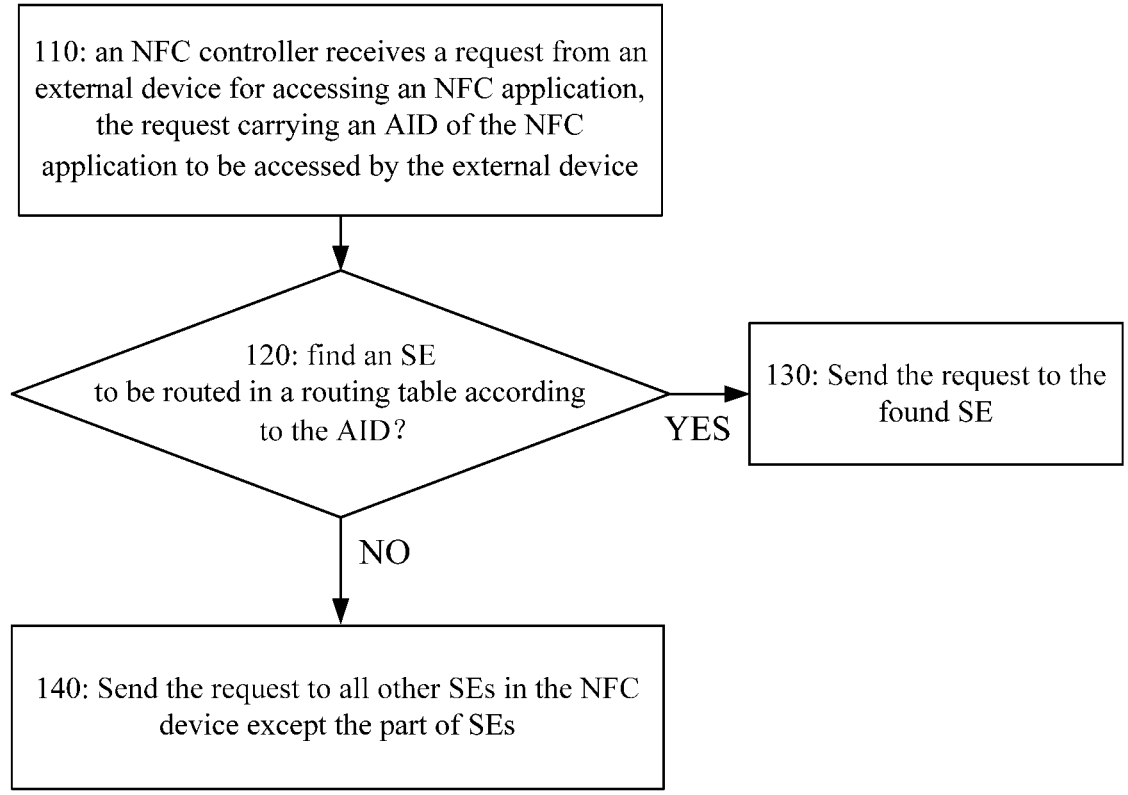
FIG. 2 is a flowchart of a routing method for multiple SEs according to Embodiment I of the present disclosure.

The routing method for multiple SEs of this embodiment is as shown in FIG. 2, including the following steps 110 to 140.

At step 110, receiving, by an NFC controller, a request from an external device for accessing an NFC application, the request carrying an AID of the NFC application to be accessed by the external device.

At step 120, searching, by the NFC controller, a routing table for a SE to be routed according to the AID carried in the request, proceeding to step 130 in a case where the SE is found, and proceeding to step 140 in a case where the SE is not found.

Here, due to limited space of the routing table, only the AID routes for/of part of the SEs in the NFC device are stored in the routing table. In this embodiment, the routing table initially stores AID routes for one SE; while in another embodiment, the routing table initially stores AID routes for one SE, but the SE is not necessarily HCE, but an SE (among the SEs) with the smallest number of AIDs registered in the NFC device, which may ensure that the routing table occupies the smallest space.

At step 130, sending, by the NFC controller, the request to the found SE.

At step 140, sending, by the NFC controller, the request to all other SEs in the NFC device except the part of SEs (i.e., to all SEs in the device other than the part of SEs).

In this embodiment, the NFC controller may send the request to all other SEs except the part of SEs in two ways, one is to broadcast the request to all the other SEs, and the other is to first send the request to one of all the other SEs, and then, in a case where no positive response is received, send the request to a next one of all the other SEs, until a positive response is received or the request has been sent to each of all the other SEs.

After the NFC controller sends the request to all the other SEs, each SE processes the request, and in a case where the request is not concerned by the SE (the AID carried in the request does not exist in the SE), the SE directly discards the request or return a negative response to the NFC controller, and in a case where the request is concerned by the SE, the SE returns a positive response to the NFC controller after the processing. There may be APPs with the same AID in different SEs, e.g., two UICCs may be of the same operator and installed with the same APP. Then, the NFC controller will receive positive responses from both UICCs.

In a case where the NFC controller receives a positive response returned from only one SE, the NFC controller returns the positive response to the external device; and in a case where the NFC controller receives plural positive responses returned from plural SEs, the NFC controller prompts, through a host operating system, a user to select one of the plural SEs, and returns the positive response returned from the SE selected by the user to the external device. After the user selects one SE, the routing table may maintain unchanged, and when the NFC receives positive responses returned from the plural SEs again, the NFC controller may further prompt, through the host operating system, the user to select one of the plural SEs. In order to avoid the trouble caused by repeated prompting, the NFC controller may add the AID route for the SE selected by the user to the routing table, and perform nonvolatile storage (long-term storage) (to store the added AID route in a non-volatile manner). When the NFC device is restarted, the added route may be rewritten into the NFC routing table, and when a request carrying the AID is received again by the NFC controller, the request may be directly routed to the SE selected by the user by searching in the routing table. To facilitate modification, the host operating system may provide a setting interface on which the SEs selectable by the user may be manually cleared or modified. The host operating system notifies the NFC controller of a corresponding user operation, the NFC controller performs a corresponding update operation on the routing table, and the updated content is also stored in a nonvolatile manner. Apparently, after the NFC device is powered on or triggered by other events, the host operating system may also perform corresponding detection, and, in a case where multiple SEs having the same AID are detected, may prompt the user to select and accordingly update the routing table according to the user's selection. In another example, only volatile storage, instead of long-term storage, is performed for addition of the route, the added route does not exist in the routing table after the NFC device is restarted, and when the NFC controller receives the request carrying the AID again, the user is still prompted to select.

In another example, after prompting the user to select one of the plural SEs through the host operating system, the NFC controller records the SE selected by the user as a preferred SE (a flag indicating preference may be added after the SE) among the plural SEs and performs nonvolatile storage, and returns, when receiving positive responses returned from the plural SEs again after recording, the positive response returned from the preferred SE to the external device. This processing mode avoids the trouble of repeated selections by the user, and simultaneously eliminates the need of writing the routing table. In this case, the host operating system may further provide a setting interface on which the user may modify or clear the preferred SE manually. The host operating system notifies the NFC controller of a user operation, and the NFC controller performs a corresponding update operation on the preferred SE and stores the updated content in a nonvolatile manner. After the NFC device is powered on, the host operating system may perform active detection, and, when multiple SEs having the same AID are detected, may prompt the user to select and record the preferred SE.

With the method of the embodiment, it is realized that several SEs of an NFC device with multiple SEs can be in working status simultaneously, and reasonable handling can be done when a conflict occurs, thereby improving the user experience. Meanwhile, the method can effectively save space of the routing table, and AID routing information of SEs is written into the routing table only when necessary.

Embodiment II

This embodiment describes an example based on Embodiment I.

Figure 3:
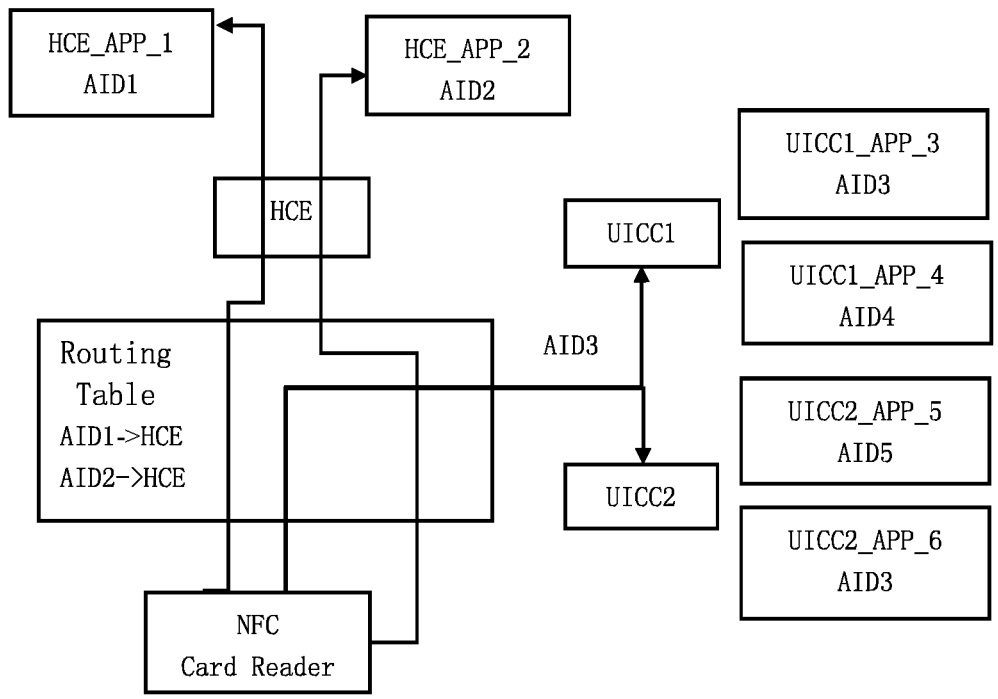
FIG. 3 is a schematic diagram of modules related to a card emulation function according to Embodiment II of the present disclosure, showing the routes initially stored in a routing table.

This example is applied to a mobile phone with an NFC function, where the modules related to the card emulation function are as shown in FIG. 1, while referring to FIG. 3, each of the three SEs, HCE, UICC1 and UICC2, has two NFC applications therein. The routing table of the NFC controller initially stores AID routes for the HCE, and the AIDs registered by the HCE are AID1 and AID2 which correspond to HCE applications HCE_APP_1 and HCE_APP_2, respectively. Therefore, it is recorded in the routing table that the SE corresponding to AID1 and AID2 is HCE, indicating that requests carrying AID1, AID2 will be routed to HCE. The AID routes for other SEs are not written in the routing table. Among other SEs, UICC1 registers AID3 and AID4, respectively corresponding to applications UICC1_APP_3 and UICC1_APP_4 in UICC1. UICC2 registers AID5 and AID6, respectively corresponding to applications UICC2_APP_5 and UICC2_APP_6 in UICC2, and both UICC1_APP_3 and UICC2_APP_6 have an AID of AID3.

During a transaction process, an NFC card reader interacts with an NFC controller of an NFC mobile phone to select an AID and send a request (or request message) carrying the AID for accessing an NFC application to the NFC controller. The NFC controller inquires an SE to which the request is to be or should be routed from the AID routing table:

In a case where the AID carried in the request is AID1 or AID2, the route for the AID can be found in the routing table, so the NFC controller sends the request to the host operating system according to the found route to be further processed by an HCE module in the host operating system. Then, the application HCE_APP_1 or HCE_APP_2 in the HCE responds to the request and returns a positive response to the NFC controller which in turn returns the positive response to the card reader after receiving the positive response.

In a case where the AID carried in the request is one of AID3 to AID5, the NFC controller cannot find a route for the AID in the routing table, so the NFC controller broadcasts the request to all other SEs in the NFC device except the HCE, i.e., to UICC1 and UICC2. Among these, in a case where the request carries AID4, the UICC1_APP_4 in UICC1 will perform processing and return a positive response, while no APP in UICC2 responds to the request and the request is discarded. Then, the NFC controller returns the positive response returned from UICC1 to the card reader.

In a case where the request carries AID5, no APP in UICC1 responds to the request, while the UICC2_APP_5 in UICC2 will perform processing and return a positive response, and then the NFC controller returns the received positive response returned from UICC2 to the card reader.

In a case where the request carries AID3, both the UICC1_APP_3 in UICC1 and the UICC2_APP_6 in UICC2 will perform processing and return a positive response. After detecting that two SEs, that is, UICC1 and UICC2, have returned positive responses, the NFC controller encapsulates the request (including identifiers of UICC1 and UICC2) and notifies the host operating system that there is an AID conflict. The host operating system prompts, via a user interface, the user to select one of UICC1 and UICC2, and notifies the UICC (herein assumed to be UICC1) selected by the user to the NFC controller. The NFC controller returns the positive response returned from UICC1 that is selected by the user to the card reader, updates the routing table, and writes AID3 and the identifier of UICC1 into the routing table correspondingly (i.e., adds an AID3 route into the routing table).

Figure 4:
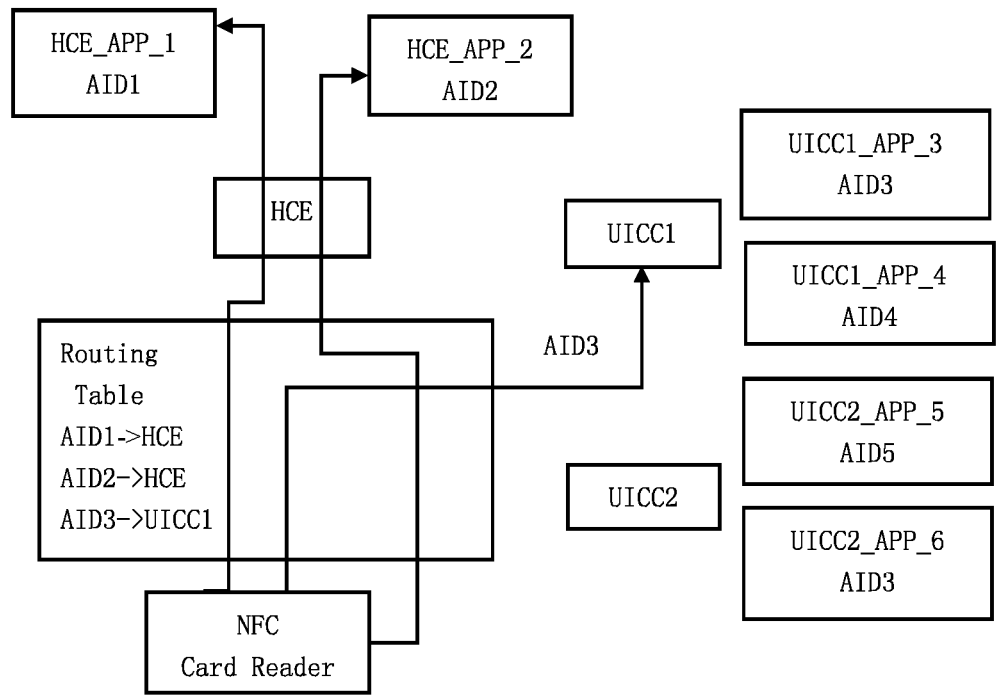
FIG. 4 is a schematic diagram of the routing table of FIG. 3 updated after a transaction according to Embodiment II of the disclosure.

The updated routing table is as shown in FIG. 4. After that, when the card reader selects AID3 again to initiate an access request, the NFC controller directly hands the request to UICC1 for processing since the AID3 route has been stored in the routing table. The AID3 route added in the routing table may be stored in a nonvolatile manner and is not influenced by power-off, or may be stored merely in a volatile manner, that is, temporarily stored.

With this method, it is realized that several SEs of a terminal device with multiple SEs can be in activated status simultaneously, i.e., can be used simultaneously, and reasonable handling can be done when a conflict occurs, thereby improving the user experience. Meanwhile, the method can effectively save space of the routing table, as AID routing information of SEs is written into the routing table only when necessary.

Embodiment III

This embodiment provides an NFC controller, an NFC device and a storage medium corresponding to the method of Embodiment I.

Figure 5:
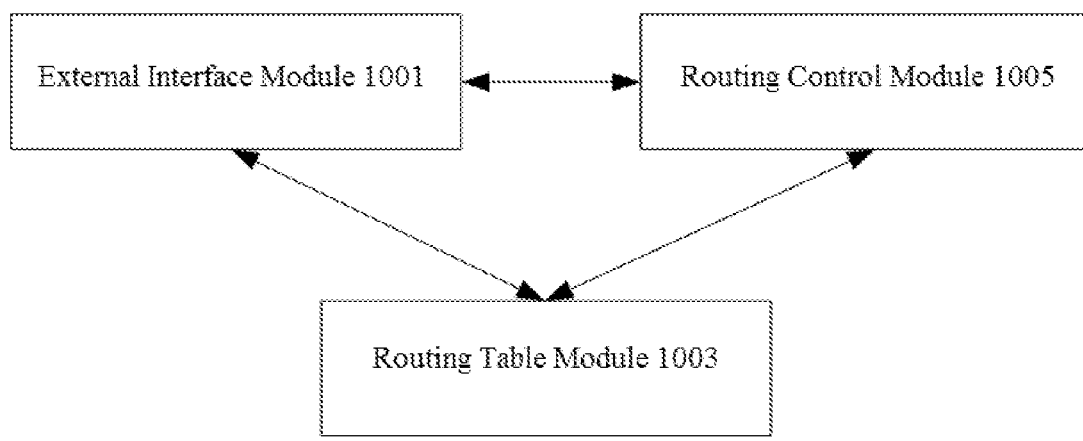
FIG. 5 is a block diagram of an NFC controller in an NFC device according to Embodiment III of the present disclosure.

The NFC controller in the NFC device of the embodiment is as shown in FIG. 5, including:

an external interface module 1001 configured to receive a request carrying an AID from an external device for accessing an NFC application;

a routing table module 1003 configured to store Application ID (AID) routes for part of secure elements (SEs) in an NFC device, the NFC device including at least three SEs capable of working simultaneously;

a routing control module 1005 configured to search the routing table for an SE to be routed according to the AID carried in the request, and send, in a case where the SE is found, the request to the found SE, and send, in a case where the SE is not found, the request to all other SEs in the NFC device except the part of SEs.

In this embodiment, the routing table initially stores AID routes for one SE, the SE being Host-based Card Emulation (HCE), or an SE with the smallest number of AIDs registered in the NFC device.

In this embodiment, after sending the request to all the other SEs, the routing control module 1005 is further configured to return a response to an external device by:

returning, in a case where only one SE returns a positive response, the positive response to the external device; and prompting, through a host operating system and in a case where positive responses returned from plural SEs are received, a user to select one of the plural SEs, and returning the positive response returned from the SE selected by the user to the external device.

In this embodiment, after prompting, through the host operating system, the user to select one of the plural SEs, the routing control module 1005 is further configured to:

add the AID route for the SE selected by the user into the routing table, and perform volatile storage; or add the AID route for the SE selected by the user into the routing table, and perform nonvolatile storage; or record the SE selected by the user as a preferred SE among the plural SEs and perform nonvolatile storage, and return, when receiving positive responses returned from the plural SEs again after recording, the positive response returned from the preferred SE to the external device.

Any processing performed by the NFC controller in the method of Embodiment I may be implemented by corresponding modules in this embodiment, which is not described in detail herein.

The NFC device of this embodiment includes at least three security elements (SEs) capable of working simultaneously, and an NFC controller. The NFC controller includes a memory, a processor, and a computer program stored in the memory and executable by the processor, wherein the processor executes the computer program to implement the steps of:

receiving a request from an external device for accessing an NFC application; and searching a routing table for an SE to be routed according to an Application ID (AID) carried in the request, AID routes for part of the SEs in the NFC device being stored in the routing table:

sending, in a case where the SE is found, the request to the found SE; and sending, in a case where the SE is not found, the request to all other SEs in the NFC device except the part of SEs.

In this embodiment, the routing table initially stores AID routes for one SE, the SE being Host-based Card Emulation (HCE), or an SE with the smallest number of AIDs registered in the NFC device.

In this embodiment, after sending the request to all the other SEs, the processor is further configured to execute the computer program to implement the steps of:

returning, in a case where only one SE returns a positive response, the positive response to the external device; and prompting, through a host operating system and in a case where positive responses returned from plural SEs are received, a user to select one of the plural SEs, and returning the positive response returned from the SE selected by the user to the external device.

In this embodiment, after prompting, through the host operating system, the user to select one of the plural SEs, the processor is further configured to execute the computer program to implement the steps of:

adding the AID route for the SE selected by the user into the routing table, and performing volatile storage; or adding the AID route for the SE selected by the user into the routing table, and performing nonvolatile storage; or recording the SE selected by the user as a preferred SE among the plural SEs and performing nonvolatile storage, and returning, when receiving positive responses returned from the plural SEs again after recording, the positive response returned from the preferred SE to the external device.

Any processing performed by the NFC controller in the method of Embodiment I may be implemented by the processor in this embodiment executing the computer program, which is not described in detail herein.

This embodiment further provides a computer readable storage medium having a computer program stored thereon, wherein the computer program, when executed by a processor, causes the following processing to be implemented:

receiving a request from an external device for accessing an NFC application; and searching a routing table for a security element (SE) to be routed according to an Application ID carried in the request, AID routes for part of the SEs in the NFC device being stored in the routing table:

sending, in a case where the SE is found, the request to the found SE; and sending, in a case where the SE is not found, the request to all other SEs in the NFC device except the part of SEs.

In this embodiment, the routing table initially stores AID routes for one SE, the SE being Host-based Card Emulation (HCE), or an SE with the smallest number of AIDs registered in the NFC device.

In this embodiment, after sending the request to all the other SEs, the computer program executed by the processor further causes the following processing to be implemented:

returning, in a case where only one SE returns a positive response, the positive response to the external device; and prompting, through a host operating system and in a case where positive responses returned from plural SEs are received, a user to select one of the plural SEs, and returning the positive response returned from the SE selected by the user to the external device.

In this embodiment, after prompting, through the host operating system, the user to select one of the plural SEs, the computer program executed by the processor further causes the following processing to be implemented:

adding the AID route for the SE selected by the user into the routing table, and performing volatile storage; or adding the AID route for the SE selected by the user into the routing table, and performing nonvolatile storage; or recording the SE selected by the user as a preferred SE among the plural SEs and performing nonvolatile storage, and returning, when receiving positive responses returned from the plural SEs again after recording, the positive response returned from the preferred SE to the external device.

Any processing performed by the NFC controller in the method of Embodiment I may be implemented when the computer program is executed by the processor, which is not described in detail herein.

Those of ordinary skill in the art will appreciate that all or some steps of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or step may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to those ordinary skilled in the art that communication medium typically includes a computer readable instruction, a data structure, a program module, or other data in a modulated data signal, such as a carrier wave or other transport mechanism, and may include any information delivery medium.

What is claimed is:

1. A routing method for multiple security elements (SEs), which is applied to a Near Field Communication (NFC) device having at least three SEs, the routing method comprising:
receiving, by an NFC controller in the NFC device, a request from an external device for accessing an NFC application;
searching, by the NFC controller, a routing table for a security element (SE) to be routed according to an Application ID (AID) carried in the request, AID routes for part of the SEs in the NFC device being stored in the routing table:
sending, by the NFC controller in a case where the SE is not found, the request to all other SEs in the NFC device except the part of SEs;
the routing table initially stores AID routes for one SE, said one SE being an SE with the smallest number of AIDs registered in the NFC device.

2. The routing method according to claim 1, wherein after the NFC controller sends the request to all the other SEs, the method further comprises:
prompting, through a host operating system and by the NFC controller in a case where positive responses returned from plural SEs are received, a user to select one of the plural SEs, and returning the positive response returned from the SE selected by the user to the external device.

3. The routing method according to claim 2, wherein after the NFC controller prompts, through the host operating system, the user to select one of the plural SEs, the method further comprises:
adding, by the NFC controller, the AID route for the SE selected by the user into the routing table, and performing volatile storage; or,
adding, by the NFC controller, the AID route for the SE selected by the user into the routing table, and performing nonvolatile storage; or,
recording, by the NFC controller, the SE selected by the user as a preferred SE among the plural SEs and performing nonvolatile storage, and returning, when receiving positive responses returned from the plural SEs again after recording, the positive response returned from the preferred SE to the external device.

4. The routing method according to claim 1, wherein after the NFC controller sends the request to all the other SEs, the method further comprises:
prompting, through a host operating system and by the NFC controller in a case where positive responses returned from plural SEs are received, a user to select one of the plural SEs, and returning the positive response returned from the SE selected by the user to the external device.

5. A non-transitory computer readable storage medium having a computer program stored thereon, wherein the computer program, when executed by a processor, causes processing according to the method of claim 1 to be implemented.

6. A Near Field Communication (NFC) controller, comprising:
an external interface module configured to receive a request carrying an Application ID (AID) from an external device for accessing an NFC application;
a routing table module configured to store AID routes for part of secure elements (SEs) in an NFC device, the NFC device having at least three SEs, the routing table initially stores AID routes for one SE, said one SE being an SE with the smallest number of AIDs registered in the NFC device;
a routing control module configured to search the routing table for an SE to be routed according to the AID carried in the request, and send, in a case where the SE is not found, the request to all other SEs in the NFC device except the part of SEs.

7. The NFC controller according to claim 6, wherein:
after sending the request to all the other SEs, the routing control module is further configured to return a response to an external device by:
prompting, through a host operating system and in a case where positive responses returned from plural SEs are received by the NFC controller, a user to select one of the plural SEs, and returning the positive response returned from the SE selected by the user to the external device.

8. The NFC controller according to claim 7, wherein:
after prompting, through the host operating system, the user to select one of the plural SEs, the routing control module is further configured to:
add the AID route for the SE selected by the user into the routing table, and perform volatile storage; or,
add the AID route for the SE selected by the user into the routing table, and perform nonvolatile storage; or,
record the SE selected by the user as a preferred SE among the plural SEs and perform nonvolatile storage, and return, when receiving positive responses returned from the plural SEs again after recording, the positive response returned from the preferred SE to the external device.

9. An NFC device, comprising at least three security elements (SEs), and an NFC controller, the NFC controller comprising a memory, a processor, and a computer program stored in the memory and executable by the processor, wherein the processor executes the computer program to implement the steps of:
receiving a request from an external device for accessing an NFC application; and
searching a routing table for an SE to be routed according to an Application ID (AID) carried in the request, AID routes for part of the SEs in the NFC device being stored in the routing table, the routing table initially stores AID routes for one SE, said one SE being an SE with the smallest number of AIDs registered in the NFC device;
sending, in a case where the SE is not found, the request to all other SEs in the NFC device except the part of SEs.

10. The NFC device according to claim 9, wherein:
after sending the request to all the other SEs, the processor is further configured to execute the computer program to implement the step of:

prompting, through a host operating system and in a case where positive responses returned from plural SEs are received, a user to select one of the plural SEs, and returning the positive response returned from the SE selected by the user to the external device.

11. The NFC device according to claim 10, wherein:
after prompting the user, through the host operating system, to select one of the plural SEs, the processor is further configured to execute the computer program to implement the steps of:
adding the AID route for the SE selected by the user into the routing table, and performing volatile storage; or
adding the AID route for the SE selected by the user into the routing table, and performing nonvolatile storage; or
recording the SE selected by the user as a preferred SE among the plural SEs and performing nonvolatile storage, and returning, when receiving positive responses returned from the plural SEs again after recording, the positive response returned from the preferred SE to the external device.

\* \* \* \* \*